3,314,894
SCINTILLATORS, COMPOUNDS USEFUL THEREIN, AND METHOD OF MAKING THE SAME
Emery Nyilas, Bedford, and Imre L. Pinter, Belmont, Mass., assignors to American Polymer and Chemical Corp., Natick, Mass., a corporation of Massachusetts
No Drawing. Filed Nov. 30, 1962, Ser. No. 241,181
2 Claims. (Cl. 252—301.2)

This invention relates to scintillators, to a new class of fluorescent chemical compounds particularly useful therein, and to a novel synthesis for such compounds.

This is a continuation-in-part of our copending patent application entitled, "Scintillators, Compounds Useful Therein, and Method of Making the Same," Ser. No. 88,673, filed Feb. 13, 1961, now abandoned.

We have discovered that compounds having the following numerous characteristics, all in combination, provide extremely useful such solutes:

(1) The compound must be a bis-2'-benzoxazole.

(2) The compound must be free of ionizable or dissociable units, such as —OH groups or the —NH groups of imidazole compounds, which have been found to prevent adequate solute activity.

(3) The compounds must contain (when written in ordinary structural form), from the outermost ring at one end to the outermost ring at the other, and not for just three, or four, or any fraction of the distance, traced through the nitrogen of each benzoxazole ring, single and double bonds alternating with perfect regularity.

(4) The compound must be capable of being written in quinoid form with a single separation of change, to conduce, as we have discovered, as a matter of molecular physics to large resonance interactions between the different portions of the molecule and high pi-electron mobility.

(5) The double bonds present when the compound is written in quinoid form as set forth in the preceding paragraph must be not less than seven in number.

(6) The compound must be soluble in an organic wavelength shifting (i.e., fluorescent) non-polar liquid or plastic of the characteristics set forth at length below.

(7) The solution of the compound in an organic fluorescent carrier as above mentioned must be transparent to all the wave lengths contacting the scintillator module, including the very short wave length module inputs, such as gamma rays; the longer ultraviolet wave length rays produced by the carrier; the longer wave lengths produced by the carrier-responsive (or "primary") solute; and the still longer wave lengths produced by the counter-signalling solute ("secondary," "tertiary," or other solute), which has a mean wave length in the range of 3900 to 4900 Angstrom units (A.U.).

(8) The compound must not be over-expensive, for example because requiring complex and elaborate procedures in synthesis.

(9) The compound should belong to one of the following groups:

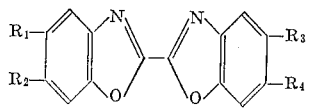

and

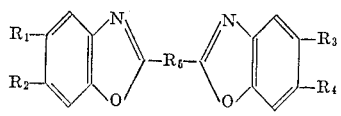

in which $R_1$, $R_2$, $R_3$, and $R_4$ are one or more of $H^-$, $CH_3^-$, $C_2H_5^-$, $CH_3O^-$, and $(CH_3)_2N^-$; and $R_5$ is either —$(CH=CH)_x^-$, —$(CH=CCH_3)^-_x$,

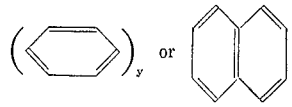

x being an integer from 1 to 4 and y an integer from 1 to 2.

We have found that surprisingly better solutes are achieved if compounds are given a molecular configuration which as a matter of molecular physics avoids undue steric hindrance. When a double bond is present in a straight chain portion between the two benzoxazole units, the compound of the solute should thus be a completely trans form; e.g., if one double bond is present it must be trans; if two double bonds are present it must be trans, trans; or if three are present it must be trans, trans, trans; and so on. One cis destroys practical utility as such a solute. The difference is most surprising, and it is even necessary that mixtures of cis and trans be avoided, so that a solute of the character dealt with in this paragraph must be used in a carrier in which the solute of its function consists essentially of fully trans type. When a double bond is present in a straight chain portion between the two benzoxazole units, no more than one $CH_3$ group per double bond must be attached to this straight chain portion, to avoid interference with molecular action producing the desired solute action.

We have found that especially and greatly improved performance as a solute of the character above set forth results if the compound is selected from the following group of novel compounds which we have discovered:

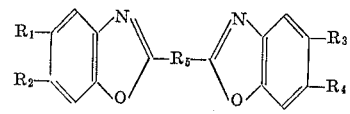

in which: $R_1$, $R_2$, $R_3$, and $R_4$ are one or more of $H^-$, $CH_3^-$, $C_2H_5^-$, $CH_3O^-$, and $(CH_3)_2N^-$; and $R_5$ is either fully trans —$(CH=CR_6)_x^-$, x being an integer from 1 to 4 and $R_6$ being either $H^-$ or $CH_3^-$, or

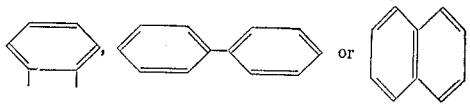

Still more exceptional performance as such a solute results if the compound is chosen from the following group of compounds which we have discovered:

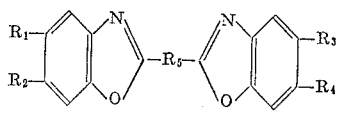

in which $R_1$ and $R_3$ are one or more of $H^-$ and $(CH_3)_2N^-$; $R_2$ and $R_4$ are one or more of $H^-$, $CH_3^-$, and $(CH_3)_2N^-$; and $R_5$ is one of —$(CH=CH)_x^-$, x being an integer from 1 to 4,

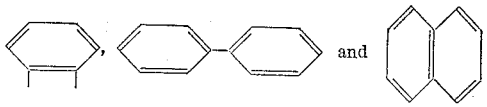

Chemical groups with higher degrees of electropositivity when attached to the outermost rings make easier the formation of quinoid-type strucutres and improve fluorescent quality. The preferred substituent group, which has the greatest electropositivity, is $(CH_3)_2N^-$. The other groups preferred, in descending order of electropositivity (and thus preference) are: $CH_3^-$, $CH_3O^-$, and $C_2H_5^-$. Of particular value are the subgroup in which $R_1$ and $R_3$ are $(CH_3)_2N^-$ and $R_2$ and $R_4$ are $H^-$, $R_5$ being as just set forth.

Some solutes are better as primary solutes and others as secondary solutes. The test used to evaluate quality in each capacity is set forth below.

Exceptionally good primary solutes are provided by the members of the following group:

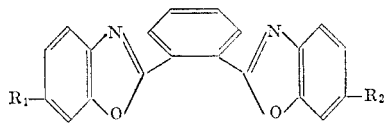

in which $R_1$ and $R_2$ are one of $H^-$ and $CH_3^-$.

Exceptionally good secondary solutes are provided by the members of the following groups:

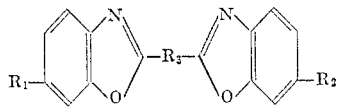

in which $R_1$ and $R_2$ are one of $H^-$ and $CH_3^-$ and $R_3$ is one of $-(CH=CH)_x^-$

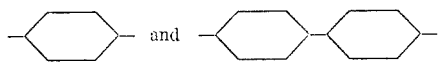

$x$ being an integer from 1 to 2; and

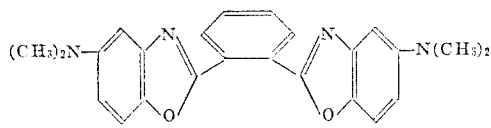

The new scintillator of the invention, in its broadest aspect, is a scintillator module which incorporates an organic fluorescent phosphor in which is dissolved, in solid or liquid solution as the case may be, at least one solute from the group specified in the paragraph above numbered "9." In narrower aspects, the scintillator module incorporates at least one solute from, in each scope, one of each of the other groups above set forth or any one or more of the particular solutes specified hereinabove and hereinbelow.

The organic carriers or solvents suitable in the scintillator module must be fluorescent, non-polar, water white, transparent, and of great purity, as has long been appreciated to be important for scintillator grade carriers. See, for example, "Preparation and Performance of Efficient Plastic Scintillators," Nucleonics, November 1953. The carriers' function is a consequence really of their physical properties rather than of their chemical construction, the latter being incidental only.

Suitable liquid carriers include the alkyl benzenes (e.g., toluene, the xylenes, the ethyl benzene, butylbenzene, mesitylene, cumene, and p-cymene) and the aromatic ethers (e.g., anisole and phenetole). Suitable solid solvent carriers are the vinyl-type polymers (including polystyrene, polystyrene cross-linked by divinylbenzene, polyvinyl toluene, polydimethylstyrene, methyl methacrylate, and copolymers of the above with vinyl naphthalene or 9-vinylanthracene).

The new synthesis is one for preparing bis-2′-benzoxazoles. It is especially useful to make wholly trans compounds with a straight chain double bond intermediate of the benzoxazole rings.

The new synthesis of the invention, which may be used to prepare the new compounds of the invention and other bis-2-benzoxazoles, may be generally set forth as follows:

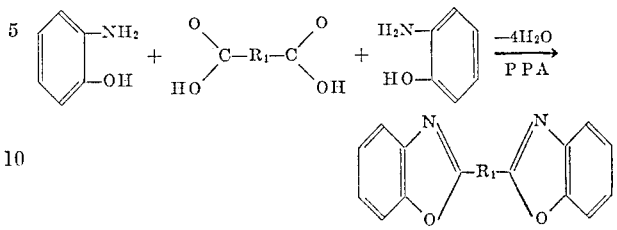

or

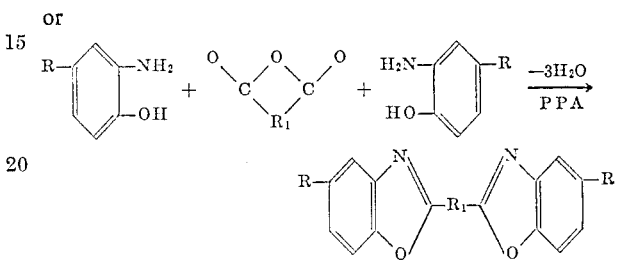

In the first reaction, two orthoaminophenol molecules were condensed with one molecule of a dicarboxylic acid, in the presence of polyphosphoric acid to yield, with loss of four molecules of water, a bis-2-benzoxazole. The orthoaminophenol used may be additionally substituted if desired (as in the other reaction and in specific detailed examples hereinafter set forth) and $R_1$ may be any suitable group (e.g.,

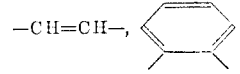

or many others specifically mentioned herein as a connecting link for bis-2-benzoxazoles) or may indeed be omitted, so that the two carbons of the dicarboxylic acid are linked directly together.

In the second reaction, an anhydride is substituted for the carboxylic acid of the first reaction, and only three molecules of water are lost in the condensation. R in this reaction may be any suitable substituent (many specific examples of substituents on the benzo-portion of oxazole rings are set forth herein), and $R_1$ may be any group as above set forth.

In use, the carrier may shift length of impinging waves to a longer length, upon which a primary solute shifts the latter to a still-longer, and if desired a secondary solute shifts the last-mentioned wave length to one yet longer, and so on. Thus, $\beta$-particles from carbon 14 may be shifted from a wave length of below 50 Angstrom units by toluene to a wave length in the ultraviolet range (e.g., 2000 Angstroms), and the latter may be further shifted by a primary solute according to the invention into the visible range (e.g., 3600 Angstroms), for counter signalling and pulse counting to measure amount of radioactivity characteristic of the $\beta$-particle radiation.

The new compounds and reaction of the invention may be explained further by detailed description of a number of examples.

Melting points given were determined with the use of a Fisher-Jones melting point apparatus.

Microanalytical data were obtained by the well-known regular procedures.

The calculation of ultraviolet absorption data, in general, was based on recording the ultraviolet spectrum of approximately $1.10^{-5}$ molar solutions of three times recrystallized samples in absolute ethanol on a Beckman DK-2 type automatic spectrophotometer. The wave length in millimicrons of characteristic absorption maxima ($\lambda_{max.}$) and minima ($\lambda_{min.}$), as well as the corresponding molar extinction coefficients (log $\epsilon_{max.}$ and log $\epsilon_{min.}$) found are indicated.

Evaluation as primary scintillators was performed by measuring the relative light-output or, in other words, the relative pulse height (r.p.h.) of toluenic solutions containing varying amounts of the substances. The maximum relative light-output of a compound dissolved in scintillation grade toluene, together with the corresponding optimum concentration, are indicative of the scintillation efficiency. To determine the relative pulse height of the substances, 8 ml. quantities of their respective toluenic solutions were placed in a beaker with sufficient optical coupling on the top of an average grade 3″ Du Mont 6363 photomultiplier tube. The 90% sensitivity of this type of tube occurs in the range of 390 m$\mu$ and 490 m$\mu$ and corresponds to so-called S–11 characteristics. The solution in the beaker and the window of the photomultiplier tube were covered with a hemispherical aluminum reflector having a highly polished surface on the inner side. The sample was then excited with 667 kev. $\gamma$-rays of an external Cesium-137 source mounted on the top of the reflector. An RCL 256-channel analyzer connected with the photomultiplier tube was used to analyze the light emitted from the irradiated toluenic solution and to record the resulting line spectrum. All light-output data obtained, viz., pulse height values, were expressed relative to that of a commonly accepted arbitrary standard which is a 3 g./l. solution of 2,5-diphenoloxazole (PPO) in scintillation grade toluene and, under the same experimental conditions, registers a pulse height regarded as 1.00.

The method of evaluation of secondary scintillators is based on the fact that a single-solute solution of 4 g./l. p-terphenyl in toluene records a relative pulse height of 0.26, as measured under the conditions described earlier. If a suitable secondary scintillator is added in a small concentration to the primary scintillator p-terphenyl, the relative pulse height of the resulting double-solute solution increases. Thus, the gain in the light-output of the mixture can be considered to be proportional to the effectiveness of the secondary solute. Accordingly, the testing of the described substances as secondary scintillators was performed on double-solute toluenic solutions containing 4 g./l. p-terphenyl as the primary solute and 0.1 g./l. amounts of the respective compounds as secondary solutes. The determination of the relative pulse height values of the mixtures was effected under conditions as above set forth.

FIRST EXAMPLE

A presently preferred solute according to the invention is trans-, trans-1,4 - bis(2′ - benzoxazolyl) - butadiene, $C_{18}H_{12}O_2N_2$.

This compound was prepared according to the following formula:

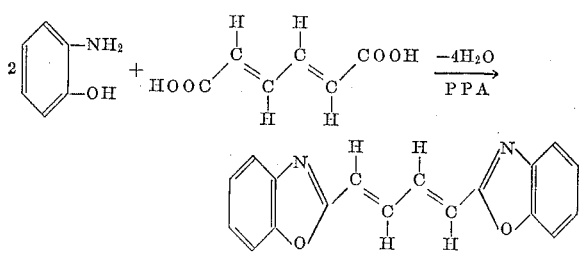

In 110 g. of polyphosphoric acid (PPA) heated to about 90° C., 5.45 g. of o-aminophenol (0.05 mole) and 3.55 g. of trans, transmuconic acid (0.025 mole) were stirred to a homogeneous paste. The mixture was then heated with continuous stirring at 185°– 190° C. for six hours, allowed to cool to about 100° C. and poured into 1.5 liters of stirred ice water. After standing at room temperature for several hours, the precipitate was collected on a filter, washed with cold water and sucked down thoroughly. The washed substance was suspended in 300 ml. of a 5% aqueous sodium carbonate solution, filtered, and washed alkali-free with water. Drying of the crude compound over concentrated sulfuric acid in vacuo yielded 6.27 g. (87.2%).

The crude substance prepared as above was mixed with 5 g. of activated carbon and extracted continuously in the Soxhlet apparatus with 800 ml. of hot dioxane for 24 hours. The extract, after being concentrated to about 250 ml., yielded 5.63 g. (78.3%) of the once recrystallized substance (M.P., 261° C. with decomposition). The second recrystallization from a hot ethanol-dioxane mixture (6:1) gave 4.91 g. (68.2%) of pure trans, trans-1,4-bis-(2′-benzoxazolyl)-butadiene (M.P., 264° C. with decomposition).

The following data were found to characterize this product:

*Analysis.*—Calcd.: C, 74.99%; H, 4.20%; N, 9.72%. Found: C, 74.85%; H, 4.25%; N, 9.72%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 254 | 3.87 | 229 | 3.75 |
| 264 | 3.86 | 284 | 3.78 |
| 334 | 4.37 | | |
| 353 | 4.56 | | |
| 387 | 4.39 | | |

SCINTILLATION EFFICIENCY

| | R.p.h. max. | Conc. (g./l.) |
|---|---|---|
| As primary (or carrier responsive) solute | 0.80 | 0.86 |
| As secondary (or counter-signalling) solute | 1.16 | 0.10 |

Written in quinoid form, as follows, this compound has 9 double bonds:

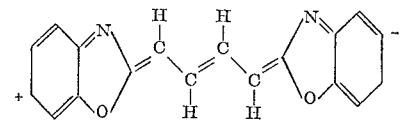

SECOND EXAMPLE

Another preferred compound of the invention is trans-1,2-bis(2′-benzoxazolyl)-ethylene ($C_{16}H_{10}O_2N_2$), which was prepared according to the following reaction:

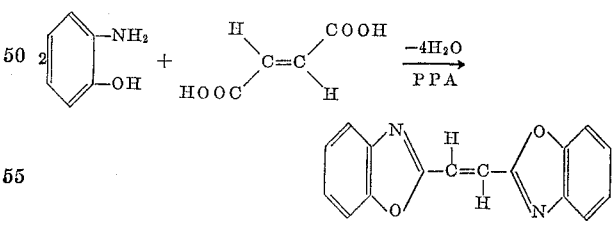

*Preparation.*—The condensation of 10.91 g. of o-aminophenol (0.1 mole) with 5.80 g. of fumaric acid (0.5 mole) was effected in 160 g. of stirred polyphosphoric acid heated to 200° C. for five hours. After allowing to cool to about 100° C., the reaction mixture was poured into 1.5 l. of ice water.

Processing of the crude product as described before gave 11.58 g. (88.4%).

Extraction of the crude compound in the Soxhlet apparatus with 1.5 l. of dioxane for 24 hours followed by activated carbon treatment and subsequent vacuum concentration of the extract to a volume of about 300 ml. yielded 10.40 g. (79.2%) of the once-recrystallized substance (M.P., 241°–242° C.).

Two successive recrystallizations with the aid of activated carbon and afforded from absolute ethanol gave 9.81 g. (74.8%) of the pure trans-1,2-bis(2′-benzoxazolyl)-ethylene melting at 244° C.

*Analysis.*—Calcd.: C, 73.28%; H, 3.85%; N, 10.69%.
Found: C, 73.04; H, 3.88; N, 10.56.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 231 | 4.05 | 219 | 4.01 |
| 264 | 3.60 | 260 | 3.55 |
| 271 | 3.72 | 274 | 3.69 |
| 277 | 3.81 | 280 | 3.75 |
| [1] 321 | 4.36 | 344 | 4.53 |
| 339 | 4.54 | | |
| 353 | 4.60 | | |
| 370 | 4.40 | | |

[1] Shoulders.

SCINTILLATION EFFICIENCY

| | R.p.h. | Conc. (g./l.) |
|---|---|---|
| As primary scintillator | 0.70 | 2.00 |
| As secondary scintillator | 1.34 | 0.10 |

THIRD EXAMPLE

A further preferred compound of the invention is trans-1,2-bis(6'-methyl-2'-benzoxazolyl)-ethylene $(C_{18}H_{14}O_2N_2)$ which was prepared by the following reaction:

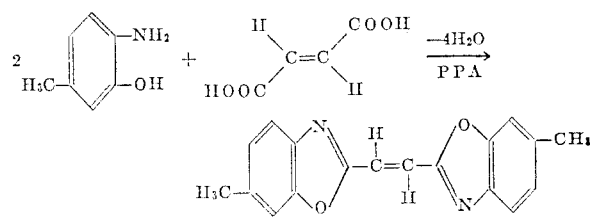

*Preparation.*—Synthesis of this compound was effected under similar conditions as those described for the preparation of trans-1,2-bis(2'-benzoxazolyl) ethylene, except that 6.10 g. of 3-hydroxy-4-amino toluene hydrochloride (0.038 mole) was reacted with 2.20 g. of fumaric acid (0.019 mole).

The yield on the crude substance was 5.25 g. (95.1%).

Extraction of the crude substance in the Soxhlet extractor with 350 ml. of hot dioxane for 8 hours followed by activated carbon treatment and subsequent vacuum concentration of the extract to a volume of 50 ml. yielded 4.97 g. (90.2%) of the once-recrystallized compound (M.P., 188°–190° C.).

Two successive recrystallizations from 95% ethanol with the aid of activated carbon gave 4.47 g. (81.3%) of the pure trans-1,2-bis[2'-(6'-methylbenzoxazolyl)] ethylene melting at 193° C.

*Analysis.*—Calcd.: C, 74.47%; H, 4.87%; N, 9.65%.
Found: C, 74.66%; H, 5.00%; N, 9.56%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 233 | 4.01 | 224 | 4.02 |
| [1] 350 | 4.62 | 266 | 3.52 |
| 362 | 4.70 | | |
| [1] 378 | 4.53 | | |

[1] Shoulders.

SCINTILLATION EFFICIENCY

| | R.p.h. max. | Conc. (g./l.) |
|---|---|---|
| As primary solute | 0.81 | 2.50 |
| As secondary solute | 1.10 | 0.10 |

FOURTH EXAMPLE

A further preferred example of compound according to the invention is 2,2'-o-phenylene bisbenzoxazole $(C_{20}H_{12}O_2N_2)$ which was prepared as follows:

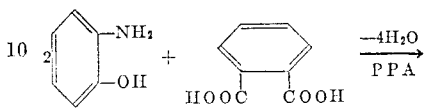

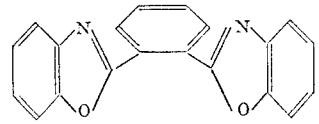

*Preparation.*—In 180 g. of polyphosphoric acid 10.91 g. of o-aminophenol (0.1 mole) were condensed with 8.80 g. phthalic acid (0.05 mole) at 220° C. for five hours. The reaction mixture was then allowed to cool to about 100° C. poured into 1.51 l. of ice water.

The crude product, which was processed as described before, weighed 14.35 g. (92%).

Purification of the crude substance was first effected by continuous extraction in the Soxhlet apparatus with 1.2 liters of hot dioxane for 16 hours. The hot extract was treated with activated carbon, filtered and concentrated in vacuo to a volume of about 300 ml. Crystallization in the cold gave 13.58 g. (86.6%) melting at 173°–174° C.

Two successive recrystallizations from absolute ethanol with the aid of activated carbon yielded 12.61 g. (80.8%) of scintillation grade 2,2'-o-phenylene bisbenzoxazole which melted sharply at 177° C.

*Analysis.*—Calcd.: C, 76.92%; H, 3.88%; N, 8.97%.
Found: C, 76.92%; H, 3.86%; N, 8.95%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 231 | 4.39 | 218 | 4.28 |
| 272 | 4.35 | 249 | 4.17 |
| 277 | 4.35 | 275 | 4.35 |
| 300 | 4.34 | 286 | 4.30 |

SCINTILLATION EFFICIENCY

| | R.p.h. | Conc. (g./l.) |
|---|---|---|
| As primary solute | 0.95 | 6.00 |
| As secondary solute | 0.97 | 0.10 |

FIFTH EXAMPLE

A further compound according to the invention is 2,2'-o-phenylene - 5,5' - dimethylamino bisbenzoxazole $(C_{24}H_{22}O_2N_4)$.

This compound was produced in two steps, as follows:

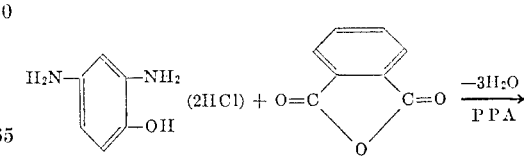

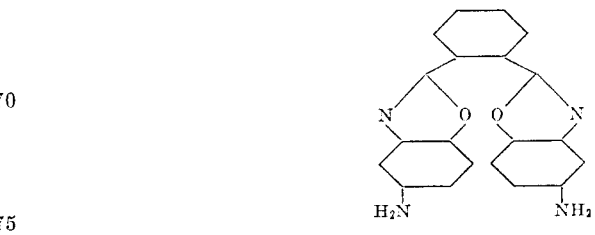

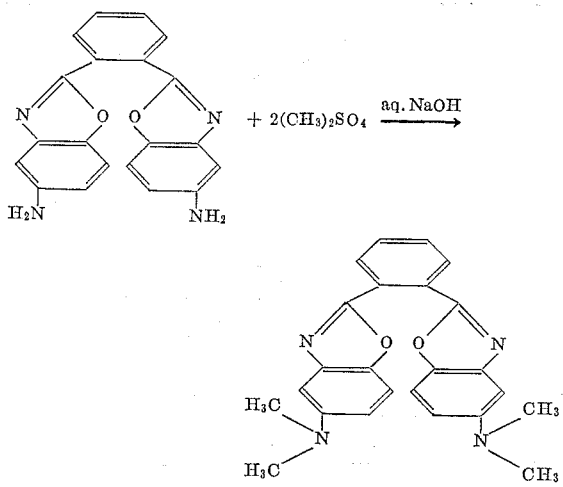

Preparation of 2,2'-o-phenylene 5,5'-diamino bisbenzoxzole

In 180 g. of polyphosphoric acid (PPA) heated to about 60° C., 19.70 g. of 2,4-diaminophenol dihydrochloride (0.1 mole) and 7.45 g. of phtalic anhydride (0.05 mole) were stirred to a homogenous paste. The mixture was then cautiously heated to 110° C. and kept there for an hour to allow the gradual evolution of the hydrochloric acid gas liberated in the course of the reaction. As the formation of the gas decreased, the temperature of the reaction mixture was elevated to 220° C. and maintained there with continuous stirring for five hours. Allowed to cool to about 100° C., the product was poured into two liters of stirred ice water. The suspension was filtered after standing overnight at room temperature. The precipitate collected was washed with successive amounts of cold water on the filter and sucked thoroughly. After drying the substance over phosphorous pentoxide in vacuo, the yield was 15.95 g. (93.2%).

Purification of the crude diamine was effected by extracting it continuously in the Soxhlet apparatus with 700 ml. of hot n-propanol for four hours. The hot extract was then treated with activated carbon, filtered and evaporated in vacuo to a volume of about 80 ml. Crystallization in the cold gave 13.97 g. (81.7%) of the substance melting at 181°–183° C.

A small amount of the compound obtained was successively recrystallized two times from absolute ethanol. The analytically pure sample of 2,2'-o-phenylene 5,5'-diamino bisbenzoxazole melted at 185° C.

*Analysis.*—Calcd.: C, 70.17%; H, 4.13%; N, 16.37%. Found: C, 69.91%; H, 4.19%; N, 16.17%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 1 222 | 3.90 | 254 | 3.68 |
| 272 | 3.75 | | |
| 1 327 | 3.42 | | |

1 Shoulder.

*Scintillation efficiency.*—There was no relative pulse height determination performed on this compound since it is an intermediate in the synthesis of 2,2'-o-phenylene 5,5'-dimethylamino bisbenzoxazole.

Preparation of 2,2'-o-phenylene 5,5'-dimethylamino bisbenzoxazole

A suspension of 6.64 g. once recrystallized 2,2'-o-phenylene 5,5'-diamino bisbenzoxazole (M.P., 182° C.) (0.02 mole) in 150 ml. of water was heated to about 90° C. In the course of 90 minutes, 10.08 g. of dimethyl sulfate (0.08 mole) were added a drop at a time at the same temperature to the continuously stirred suspension of the diamine. The pH of the reaction mixture during this period was maintained in the range of 8 to 9 by adding small amounts of sodium carbonate when necessary. The temeprature of the suspension was kept at 85°–90° C. for another hour. The reaction mixture was then cooled to about 10° C. and filtered. The precipitate collected was subsequently washed with small amounts of cold 1 N. sodium hydroxide, 1 N. hydrochloric acid, and finally with water. After drying over concentrated sulfuric acid in vacuo, the crude product weighed 6.12 g. (76.9%).

Three subsequent recrystallizations from ethanol with the aid of activated carbon yielded 5.07 g. (63.7%) of spectroscopically pure 2,2'-o-phenylene 5,5'-dimethyl-amino bisbenzoxazole which melted at 173–174° C.

*Analysis.*—Calcd.: C, 72.34%; H, 5.58%; N, 14.06%. Found: C, 72.19%; H, 5.50%; N, 14.21%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 229 | 3.97 | 256 | 3.60 |
| 1 284 | 3.90 | | |
| 340 | 4.12 | | |

1 Shoulder.

SCINTILLATION EFFICIENCY

| | R.p.h. | Conc. (g./l.) |
|---|---|---|
| As primary solute | 0.64 | 4.50 |
| As secondary solute | 1.29 | 0.10 |

SIXTH EXAMPLE

A further embodiment of compounds according to the invention is 2,2'-o-phenylene bisbenzoxazole

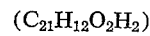

prepared according to the following reaction:

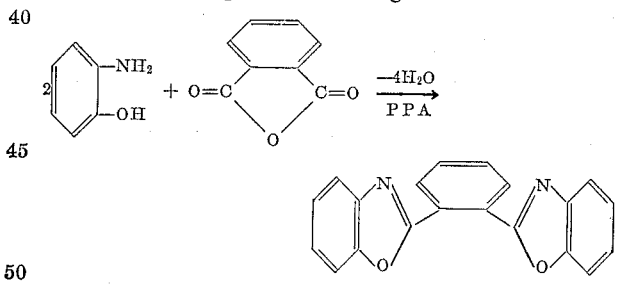

*Preparation.*—The condensation type of reaction between 10.91 g. of o-aminophenol (0.1 mole) and 7.40 g. of phthalic anhydride (0.05 mole) was effected in 180 g. of stirred polyphosphoric acid (PPA) heated to 250° C. for five hours. The reaction mixture was slowly cooled to about 120° C. and then poured in a thin stream into 1.5 liters of rapidly stirred ice water. The crude substance, which has precipitated after standing in the cold for several hours, was collected on a filter and washed. It was then treated with 500 ml. of a 5% aqueous sodium carbonate solution, refiltered, and washed alkali-free with cold water. After drying over concentrated sulfuric acid in vacuo, 13.78 g. (88.3%) of the crude compound was obtained.

As for the first step of purification, the substance prepared as above was continuously extracted with 700 ml. of hot dioxane for twelve hours. While still hot, the extract was clarified with activated carbon, filtered, and evaporated in vacuo to a volume of 70 ml. Upon cooling the still red-tinted solution to about 6° C., 12.59 g. (80.7%) of 2,2'-o-phenylene bisbenzoxazole (M.P., 170°–172° C.) crystallized in a few hours. For further purification, the once-recrystallized compound was dissolved in 900 ml. of hot absolute ethanol. The solution was cooled to about 40° C. and kept there for fifteen minutes in order to allow the precipitation of the bulk of a colored impurity. After having separated the precipitated impurity by filtration, the solution was treated with activated carbon in the hot and filtered. From the mother-liquor which was evaporated to about one-third of its original volume, 11.36 g. (72.8%) of white needles of 2,2'-o-phenylene bibenzoxazole crystallized, melting sharply at 177° C.

*Analysis.*—Calcd.: C, 76.92%; H, 3.88%; N, 8.97%. Found: C, 76.92%; H, 3.87%; N, 8.95%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 231 | 4.39 | 218 | 4.28 |
| 272 | 4.35 | 249 | 4.17 |
| 277 | 4.35 | 275 | 4.35 |
| 300 | 4.34 | 286 | 4.30 |

SCINTILLATION EFFICIENCY

| | R.p.h. max. | Conc. (g./l.) |
|---|---|---|
| As primary solute | 0.94 | 6.00 |
| As secondary solute | 1.02 | 0.10 |

This compound, written in quinoid form, as follows, includes ten double bonds:

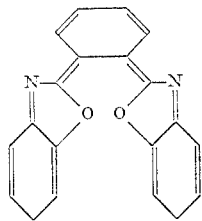

*Seventh Example*

Another compound according to the invention is trans-1,2-bis(2'-(5'-methylbenzoxazolyl))-ethylene ($C_{18}H_{14}O_2N_2$)

which was prepared according to the formula:

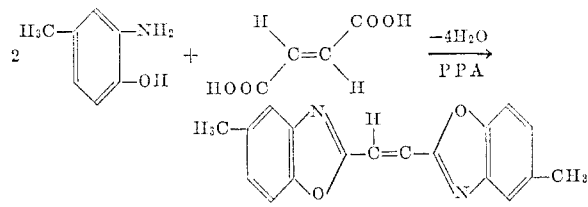

*Preparation.*—A mixture of 9.85 g. of 3-amino-4-hydroxy toluene (0.08 mole) and 4.64 g. of fumaric acid (0.04 mole) in 120 g. of polyphosphoric acid (PPA) was heated at 215° C. for four hours with continuous stirring. The hot product was allowed to cool to about 100° C. and was then poured into 1.5 liters of stirred ice water. Precipitation of the crude substance occurred after standing in the cold for several hours. The precipitate was filtered, washed with water in the filter, and then taken up in 500 ml. of a 5% aqueous sodium carbonate solution. The suspension was filtered again, and the collected precipitate was washed with small amounts of cold water until the filtrate appeared to be alkali-free. The crude compound which was dried over phosphorous pentoxide in vacuo weighed 10.65 g. (91.6%).

Purification of the crude product was effected by extracting it continuously in the Soxhlet apparatus with 700 ml. of hot absolute ethanol for eight hours. The hot alcoholic extract was treated with activated carbon and filtered. After being concentrated in vacuo to a volume of about 150 ml., 7.04 g. (60.3%) of trans-1,2-bis(2'-(5'-methylbenzoxazolyl))-ethylene (M.P., 183°–185° C.) crystallized from the filtrate in the cold.

A second recrystallization, which was performed in 750 ml. of hot absolute ethanol with the aid of activated carbon, yielded 6.55 g. (57.4%) of the pure substance (M.P., 191°–192° C.).

*Analysis.*— Calcd.: C, 74.47%; H, 4.87%; N, 9.65%. Found: C, 74.75%; H, 4.96%; N, 9.38%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 235 | 4.08 | 226 | 4.03 |
| 280 | 3.79 | 264 | 3.61 |
| 285 | 3.90 | 294 | 3.85 |
| 348 | 4.41 | | |
| 363 | 4.46 | | |
| 377 | 4.27 | | |

SCINTILLATION EFFICIENCY

| | R.p.h. max. | Conc. (g./l.) |
|---|---|---|
| As primary solute | 0.56 | 4.00 |
| As secondary solute | 0.95 | 0.10 |

EIGHTH EXAMPLE

Another compound of the invention is 2,2'-(4,4'-biphenylene)-bisbenzoxazole ($C_{26}H_{16}O_2N_2$). This was prepared as follows in accordance with the following reaction:

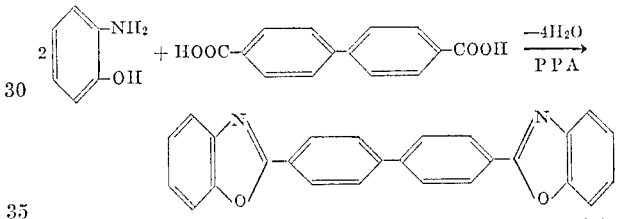

*Preparation.*—10.91 g. of o-aminophenol (0.1 mole) were condensed with 12.1 g. of biphenyl-4,4'-dicarboxylic acid (0.05 mole) in 150 g. of stirred polyphosphoric acid (PPA) heated to 225° C. for five hours. The reaction mixture was cooled gently to about 130° C. then poured into 1.5 liters of stirred ice water. After standing overnight at room temperature, the product was collected on a filter and washed with water. Acidic impurities were eliminated by treating the substance with 100 ml. of a 2 N sodium hydroxide solution. The alkaline suspension was refiltered, and the precipitate collected was washed with successive amounts of water. Subsequent drying over phosphorous pentoxide in vacuo yielded 19.30 g. (99.4%) of the crude compound.

The crude product prepared as described above was extracted continuously in the Soxhlet apparatus with 1500 ml. of hot dioxane for forty-eight hours. The extract was then shortly refluxed in the presence of activated carbon, filtered and concentrated in vacuo to a volume of 200 ml. Crystallization over several days in the cold yielded 14.87 g. (76.6%) of the substance melting at 341°–343° C. After a second recrystallization from hot dioxane 13.2 g. (67.9%) of 2,2'-(4,4'-biphenylene) bisbenzoxazole (M.P. 349°–350° C., decomposed) were obtained.

*Analysis.*—Calcd.: C, 80.40%; H, 4.16%; N, 7.21%. Found: C, 80.33%; H, 4.06%; N, 7.09%.

ULTRAVIOLET ABSORPTION SPECTRUM

| $\lambda_{max.}$ (m$\mu$) | log $\epsilon_{max.}$ | $\lambda_{min.}$ (m$\mu$) | log $\epsilon_{min.}$ |
|---|---|---|---|
| 225 | 3.92 | 219 | 3.90 |
| 334 | 4.95 | 251 | 3.63 |

SCINTILLATION EFFICIENCY

| | R.p.h. max. | Conc. (g./l.) |
|---|---|---|
| As primary solute | 0.26 | 0.10 |
| As secondary solute | 1.23 | 0.10 |

Written in quinoid form, this compound has thirteen double bonds.

OTHER COMPOUNDS

Other examples of compounds of the invention which have been made according to the process of the invention and which have been shown to be useful scintillators are:

trans-1,2-bis(5'-dimethylamino-2'-benzoxazolyl) - ethylene ($C_{20}H_{20}O_2N_4$)

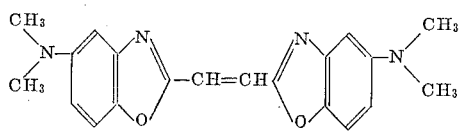

trans-1,2-bis(6'-dimethylamino-2'-benzoxazolyl) - ethylene ($C_{20}H_{20}O_2N_4$)

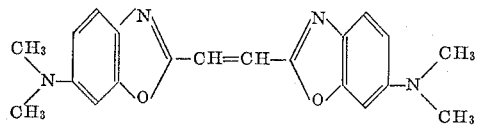

trans,trans-1,4-bis(5'-methyl-2'-benzoxazolyl) - butadiene ($C_{20}H_{16}O_2N_2$)

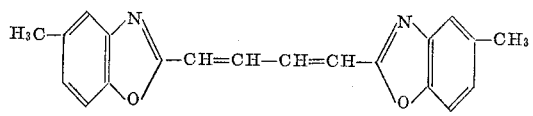

trans,trans-1,4-bis(6'-methyl-2'-benzoxazolyl) - butadiene ($C_{20}H_{16}O_2N_2$)

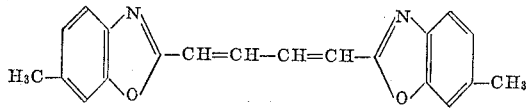

2,2'-o-phenylene bis - 5' - methylbenzoxazole or 2,2'-o-phenylene-5,5'-dimethyl bisbenzoxazole ($C_{22}H_{16}O_2N_2$)

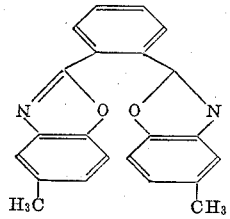

2,2' - o - phenylene - 6,6' - dimethyl bisbenzoxazole ($C_{22}H_{16}O_2N_2$)

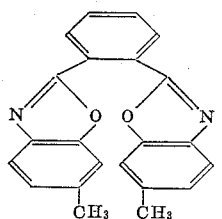

2,2'-o-phenylene-6,6'-dimethylamino bisbenzoxazole ($C_{24}H_{22}O_2N_2$)

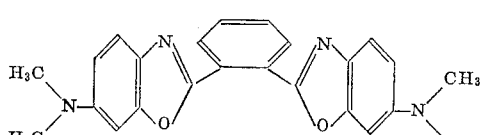

2,2'-(4,4'-biphenylene) bisbenzoxazole ($C_{26}H_{16}O_2N_2$)

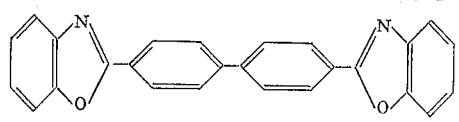

2,2'-(4,4'-biphenylene)-5,5'-dimethyl bisbenzoxazole ($C_{28}H_{20}O_2N_2$)

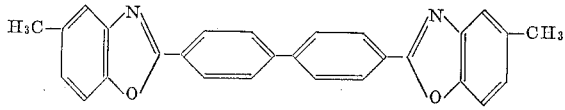

2,2'-(4,4'-biphenylene)-6,6'-dimethyl bisbenzoxazole ($C_{28}H_{20}O_2N_2$) and

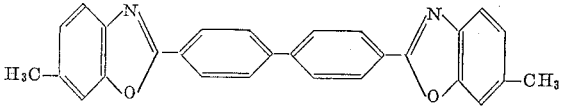

2,6-(bis(2'-benzoxazolyl)-naphthalene ($C_{24}H_{14}O_2N_2$)

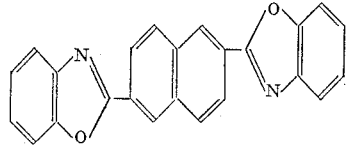

The preparation of scintillators using toluene and the preferred and other compounds of the invention as primary and secondary wave length shifters has already been described, in discussing evaluation as primary and secondary scintillators. The preferred quantities of the compounds dissolved in the toluene to obtain preferred scintillators are set forth under each respective compound. Other organic liquid phosphors may if desired be substituted for toluene: e.g., anisol and xylene. In using compounds of the invention as secondary (and tertiary and so on) wave length shifters, the primary wave length shifter may be any suitable material, including p-terphenyl, compounds of the invention, and other compounds hereinafter and above referred to.

Other compounds which have been found capable of useful wave-length shifting activity when dissolved in organic phosphors include these which have been made by the process of the invention:

2,2'-bis-benzoxazole ($C_{14}H_8O_2N_2$)

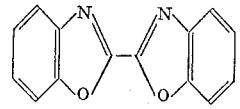

2,2'-p-phenylene bisbenzoxazole ($C_{21}H_{12}O_2N_2$)

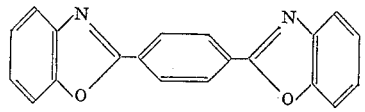

2,2'-p-phenylene-5,5'-dimethyl bisbenzoxazole ($C_{22}H_{16}O_2N_2$)

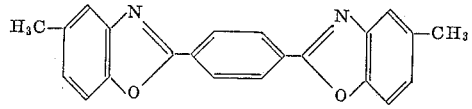

and 2,2'-p-phenylene-6,6'-dimethyl bisbenzoxazole ($C_{22}H_{16}O_2N_2$)

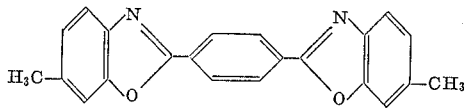

The compounds of the invention and the compounds referred to generally and specifically in the preceding paragraph are also useful wave-length shifters (primary, secondary, tertiary, and other) in clear plastics such as polystyrene, polystyrene cross-linked by divinylbenzene, polyvinyl toluene, polydimethylstyrene, and methyl methacrylate. The novel scintillators of the invention include all the compounds referred to in this paragraph when disposed in plastics or organic liquid phosphors to provide a scintillator, in combination with other wave-length shifting compounds heretofore known, such as p-terphenyl, or otherwise.

An example of a plastic scintillator according to the invention is now set forth.

NINTH EXAMPLE

An ampule containing 55 ml. of freshly vacuum distilled vinyl toluene, 1.25 g. (2.5 wt. percent) of p-terphenyl and 50 mg. (0.1 wt. percent) of 2,2'-(4,4'-biphenylene) bisbenzoxazole was evacuated to about 0.05 Hg mm. pressure. Gases dissolved in the vinyl toluene were removed by alternative cooling of the vial with Dry Ice-acetone and allowing it to warm up to about room temperature.

The ampule was then sealed under argon atmosphere and immersed into an oil bath. Polymerization of the vinyl toluene was achieved by keeping the temperature of the solution constantly at 125° C. for four days. To allow annealing of the plastic formed during the heating period, the temperature of the bath was gradually decreased to about 45° C. in the next three days. After cracking the container the plastic was removed, machined to a disc of 1 inch in diameter and ½ inch height and finally polished.

The relative pulse height of this plastic phosphor was determined under conditions identical to those described for liquid samples, except that the light output was compared to that of an anthracene crystal having the same dimensions. The scintillation efficiency of anthracene is the commonly accepted standard for organic crystalline and plastic fluors and is assumed to be equivalent to 1.00.

Relative pulse height found was 0.54.

The new synthesis of the invention has been set forth above, first generally, and then by numerous specific examples in connection with the various examples of compounds of the invention above disclosed.

Other embodiments of the invention in addition to the exemplary ones above set forth and within the following claims will occur to those skilled in the art.

We claim:

1. A scintillator consisting essentially of transparent, water-white, optically pure, non-polar, organic, fluorescent solvent carrier and fluorescent solute dissolved therein, said solute being present in an effective amount, in proportion to the amount of said solvent carrier, to significantly increase the wave length of incident light energy, said solute being selected from the class consisting of

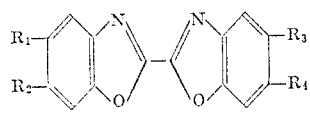

and

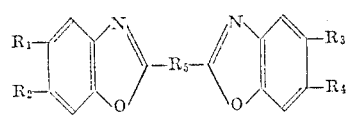

in which $R_1$, $R_2$, $R_3$, and $R_4$ are selected from the class consisting of $H^-$, $CH_3^-$, $C_2H_5^-$, $CH_3O^-$, and $(CH_3)_2N^-$; and $R_5$ is selected from the class consisting of fully trans —$(CH=CR_6)_x$—,

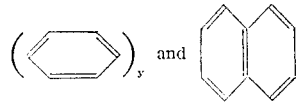

wherein $R_6$ is chosen from the group consisting of $H^-$ and $CH_3^-$, $x$ is an integer from 1 to 4, and $y$ is an integer from 1 to 2.

2. The scintillator of claim 1 in which said carrier is one of the group consisting of toluene, the xylenes, the ethyl benzenes, butylbenzene, mesitylene, cumene, p-cymene, anisole, phenetole, polystyrene, polystyrene cross-linked by divinylbenzene, polyvinyl toluene, polydimethylstyrene, methyl methacrylate, and copolymers of vinyl naphthalene and 9-vinylanthracene with one of polystyrene, polyvinyl toluene, polydimethylstyrene, lene methyl methacrylate, and polystyrene cross-linked by divinylbenzene.

References Cited by the Examiner

UNITED STATES PATENTS

| | | | |
|---|---|---|---|
| 2,072,908 | 3/1937 | Schneider | 260—240 X |
| 2,438,392 | 10/1949 | Meyer et al. | 260—240 |
| 2,793,192 | 5/1957 | Leavitt | 252—301.2 |
| 2,842,545 | 7/1958 | Duennenberger et al. | 260—240 |
| 2,977,319 | 3/1961 | Ackermann et al. | 252—301.2 |
| 2,984,644 | 5/1961 | Frey et al. | 260—240.5 |
| 2,985,593 | 5/1961 | Broderick et al. | 252—301.2 |
| 2,985,661 | 5/1961 | Hein et al. | 252—301.2 |
| 2,995,564 | 8/1961 | Duennenberger et al. | 260—307 |
| 3,118,883 | 1/1964 | Duennenberger et al. | 252—301.2 |

FOREIGN PATENTS

| | | |
|---|---|---|
| 567,665 | 12/1958 | Canada. |
| 578,303 | 6/1959 | Canada. |
| 1,055,155 | 4/1959 | Germany. |

OTHER REFERENCES

Nyilas et al.: Benzoxazoles J. Am. Chem. Soc. vol. 82, p. 609–611 (Feb. 5, 1960).

TOBIAS E. LEVOW, *Primary Examiner.*

NICHOLAS S. RIZZO, MAURICE A. BRINDISI,
*Examiners.*

J. D. RANDOLPH, R. D. EDMONDS,
*Assistant Examiners.*